United States Patent [19]
Lang

[11] Patent Number: 5,671,129
[45] Date of Patent: Sep. 23, 1997

[54] ELECTRONIC SWITCHED-MODE POWER SUPPLY FOR SUPPLYING POWER TO AN ACCUMULATOR

[75] Inventor: Gerhard Lang, Altweilnau, Germany

[73] Assignee: Braun Aktiengesellschaft, Kronberg, Germany

[21] Appl. No.: 428,213

[22] PCT Filed: Nov. 9, 1993

[86] PCT No.: PCT/EP93/03136

§ 371 Date: Aug. 4, 1995

§ 102(e) Date: Aug. 4, 1995

[87] PCT Pub. No.: WO94/14221

PCT Pub. Date: Jun. 23, 1994

[30] Foreign Application Priority Data

Dec. 5, 1992 [DE] Germany .................. 42 41 065.7

[51] Int. Cl.⁶ .................................................. H02J 7/10
[52] U.S. Cl. ................................................... 363/19
[58] Field of Search ............................ 320/19–23, 32, 320/39, 40–42

[56] References Cited

U.S. PATENT DOCUMENTS

3,585,482  6/1971  Zelina ............................ 320/39
4,965,506  10/1990  Algra et al. ..................... 320/23

FOREIGN PATENT DOCUMENTS

0 226 253  6/1987  European Pat. Off. .

*Primary Examiner*—Aditya Krishnan
*Attorney, Agent, or Firm*—Fish & Richardson, P.C.

[57] ABSTRACT

The invention is directed to an electronic switched-mode power supply for supplying power to an accumulator (61), comprising a self-oscillating flyback converter having a transformer (50), a switching transistor (1) with an emitter resistor (22) and a feedback circuit (11, 27). A control circuit (St) inhibits conduction of the switching transistor (1) when the switching voltage at the accumulator (61) has reached a predetermined upper level (A). A switching arrangement (SE) lowers the upper switching voltage (A) to a lower switching voltage (B) when, with the switched-mode power supply in the pulsed mode, the ratio of the duration of oscillation pauses to the duration of oscillation bursts exceeds a specified magnitude.

10 Claims, 3 Drawing Sheets

ELECTRONIC SWITCHED-MODE POWER SUPPLY FOR SUPPLYING POWER TO AN ACCUMULATOR

This invention relates to an electronic switched-mode power supply for supplying power to an accumulator from an input voltage source, comprising a self-oscillating flyback converter having a transformer whose primary winding, in series arrangement with the collector-emitter circuit of a switching transistor and a resistor, is connected in parallel with the input voltage source, and whose secondary winding is connected in series with the accumulator and a diode, with the base of the switching transistor being connected to the secondary winding through a feedback circuit in addition to being coupled to a control circuit inhibiting conduction of the switching transistor when the switching voltage at the accumulator has reached a predetermined upper level, and rendering it conducting again when the switching voltage has dropped below this level.

A switched-mode power supply of this type is known, for example, from EP 0 162 341 B1. After a specified (adjustable) upper switching voltage is reached, the charging current is controlled by the pulsed mode of the switched-mode power supply, that is, by means of the ratio of the duration of oscillation pauses to the duration of oscillation bursts of the converter. FIG. 5 is a graph showing the typical curve of the cell voltage during charging of an accumulator, plotted as a function of the stored charge. When it is desired to recharge a depleted accumulator as rapidly as possible, it is necessary for the switching voltage to be as high as possible. However, in such a switched-mode power supply, this switching voltage cannot reside at any desired point close to the top (hump) of the charging curve, because then the trickle-charging current flowing after the accumulator is charged to full capacity would be too high which would be detrimental to the accumulator.

It is an object of the present invention to configure a switched-mode power supply of the type initially referred to such as to permit a high charge in a minimum possible time, without the trickle-charging current rising in an inadmissible way.

This object is accomplished in that a switching arrangement is provided which operates on the control circuit such that the upper switching voltage is lowered to a lower switching voltage when, with the switched-mode power supply in the pulsed mode, the ratio of the duration of oscillation pauses to the duration of oscillation bursts exceeds a specified magnitude.

This has the advantage that the upper switching voltage of the switched-mode power supply can be increased to a level enabling the accumulator to be charged to at least about 80% of its rated capacity within a relatively short period of time. By evaluating the ratio of pulse spaces to pulse duration, an adjustment of the upper and lower switching voltage is only necessary in a greatly expanded tolerance field. After the switching voltage is lowered, setting an end to the high-current charge, the switched-mode power supply is deactivated until the accumulator voltage has reached the level of the lower switching voltage. At the end of this high-current charge, the charge acceptance response of the accumulator is rather poor as a result of the temperature increase. After the accumulator has cooled down, the lower switching voltage is reached, and recharging of the accumulator is continued until it is fully charged, yet starting with a lower charging current than before.

Advantageously, the switching arrangement is comprised of an evaluating circuit with a capacitor which is charged during the occurrence of oscillation pauses and is discharged during the occurrence of oscillation bursts, and a trigger circuit which passes to the other condition after the voltage across the capacitor has reached a specified level and drives an adjusting device reducing the switching voltage of the control device.

By evaluating the ratio of the duration of oscillation pauses to the duration of oscillation bursts, it is possible to annunciate a defined state of charge of the accumulator.

Further advantageous embodiments will become apparent from the other subclaims and the description.

An embodiment of the present invention will be described in more detail in the following with reference to the accompanying drawings. In the drawings, FIG. 1 is a schematic circuit diagram of an electronic switched-mode power supply incorporating a switching arrangement;

Figure 1:
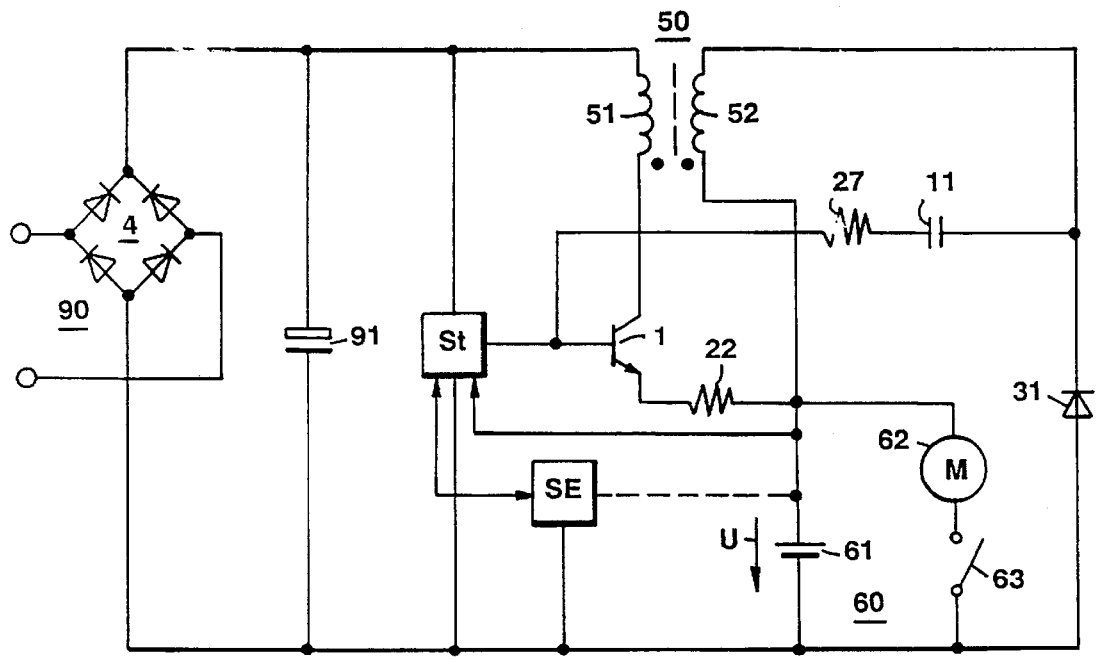

The schematic circuit diagram of an electronic switched-mode power supply shown in FIG. 1 is comprised of a flyback converter energized from a DC or AC supply 90 through a bridge rectifier arrangement 4. Connected in parallel with the DC input terminals of the bridge rectifier arrangement 4 is an input capacitor 91 for filtering and smoothing the input voltage.

Connected in parallel with the input capacitor 91 is the series arrangement comprising the primary winding 51 of a transformer 50 and the load circuit of a switching transistor 1 and a resistor 22. The secondary winding 52 of the transformer 50 is connected in series with a diode 31 and a load arrangement 60. The load arrangement 60 is comprised of an accumulator 61 and an electrical load 62 as, for example, a direct-current motor, which is adapted to be switched on by a switch 63.

Through a feedback circuit comprised of the series arrangement of a feedback resistor 27 and a feedback capacitor 11, the base of the switching transistor 1 is connected to the one end of the secondary winding 52 of the transformer 50, and to a control circuit St. The control circuit St is operated on by the voltage U at the accumulator 61, that is, when a predetermined voltage U is reached, the switching transistor 1 will be cut off, preventing it from restarting immediately with the building up of oscillations, and it is only after the voltage U has dropped that the switching transistor is brought back into conduction. In this manner, oscillation bursts occur (periods of time in which the flyback converter is oscillating), with pauses between the bursts. The more closely the accumulator approaches a fully charged condition, the longer become the oscillation pauses as compared with the oscillation bursts.

When the ratio of the duration of pulse spaces to the duration of pulse bursts exceeds a predetermined magnitude, a switching arrangement SE lowers the predetermined (upper) switching voltage of the control circuit St to a lower switching voltage, deactivating the switched-mode power supply until the accumulator voltage U has dropped to the level of this lower switching voltage.

Figure 2:
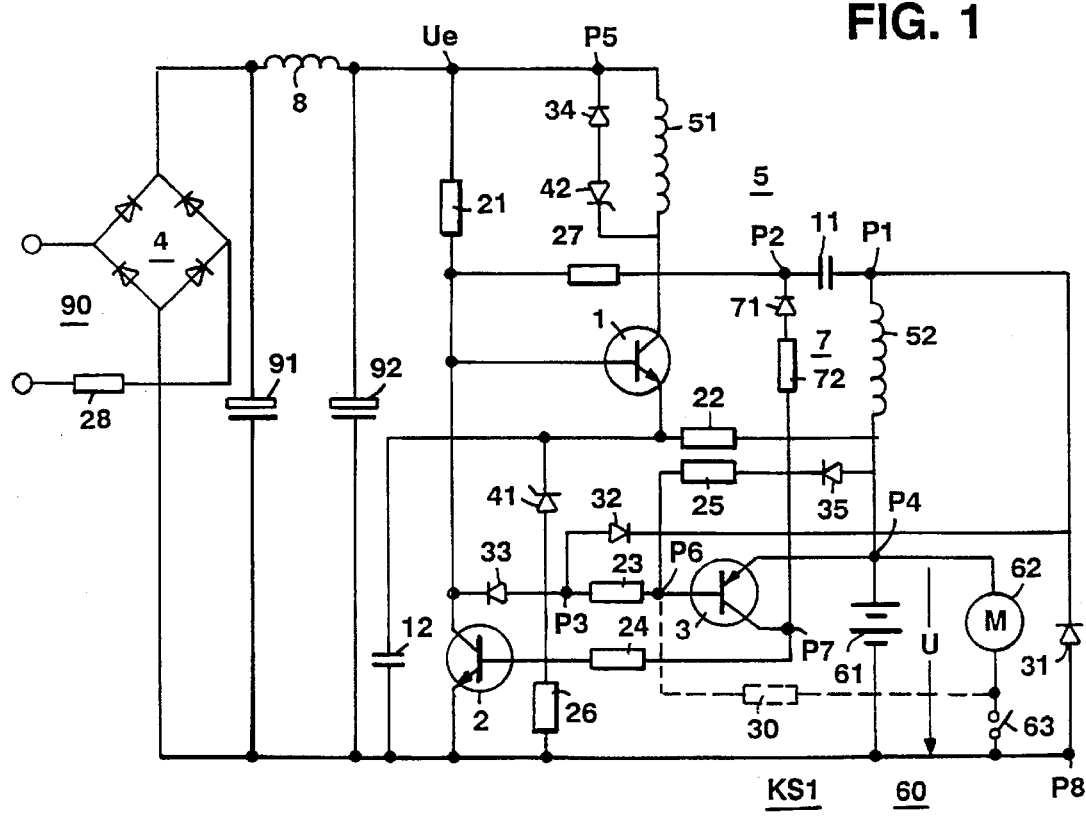
FIG. 2 is a diagram illustrating an embodiment of an electronic switched-mode power supply of the type initially referred to, as known from EP 0 162 341.

FIG. 2 illustrates an electronic switched-mode power supply known from EP 0 162 341. Following rectification by means of the bridge rectifier arrangement 4 and filtering and smoothing by means of the series choke 8 and, respectively, the parallel capacitors 91, 92, a low base current will drive, through the resistor 21, the transistor 1 operating as a switching transistor.

As a result of the transistor 1 switching on, a positive feedback effect occurs through the switching path of the transistor 1 and the primary winding 51 of the transformer 5, driving the transistor 1 additionally and placing it in the conductive state. The collector current will rise linearly, producing a proportional voltage across the resistor 22. When the current has reached a specified peak value, the transistor 2 will be driven through the Zener diode 41, thereby going into conduction and connecting the base of the transistor 1 to reference potential or ground, whereby base current will be withdrawn from the transistor 1, cutting the transistor 1 off. With the beginning of the off period, the polarity of the voltage induced in the secondary winding 52 of the transformer 5 will be reversed at the junction point P1 of the feedback capacitor 11. In accordance with the principle of a flyback converter, the energy stored in the transformer 5 will thus be delivered to the load arrangement 60 through the diode 31.

During the reversal process of the transformer 5, the diode 34 as well as the Zener diode 42 which are connected in parallel with the primary winding 51 of the transformer 5 will limit the flyback voltage peak during the off period.

The negative voltage occurring at the junction point P1 during the full transformer discharge period is delivered through the diode 32 to the node P3, that is, to the junction of the diode 33 and the resistor 23 in the base circuit of the transistor 3. As a result of this negative voltage, the transistor 3 becomes conducting.

During the on-period of the transistor 1, the feedback capacitor 11 was charged through the feedback resistor 27, producing a negative polarity at the node P2 of the feedback capacitor 11.

With the transistor 3 in its conductive state, this charge with negative polarity at the node P2 discharges, through the discharge circuit 7 comprising the discharging diode 71 and the discharging resistor 72, and through the conducting collector-emitter circuit of the transistor 3, to the node P4, that is, the positive pole of the accumulator 61, enabling the transistor 1 to go into conduction relatively rapidly at the end of the discharge cycle also in the presence of a low input voltage (12 volts, for example), that is, the switched-mode power supply is in a position to build up oscillations again readily.

When the accumulator voltage U reaches or exceeds its desired level, that is, the predetermined upper turnoff voltage, the transistors 2 and 3 will remain conductive, and at the node P1 the capacitor 11 will be electrically connected, through the secondary winding 52 of the transformer 5, to the positive terminal of the accumulator 61, and at the node P2, through the resistor 27 and the conducting transistor 2, to ground or reference potential. This renders the junction point P2 of the feedback capacitor 11 negative again with respect to the junction point P1. The magnitude of this negative voltage is determined by the discharging diode 71, the discharging resistor 72 and the resistor 27. The conducting voltage comparator, that is, the conducting transistors 2 and 3, prevents the transistor 1 from switching on again until the accumulator voltage U has dropped below the predetermined desired value, thereby causing the comparator, that is, the transistors 2 and 3, to become non-conducting. In the non-conductive state of the transistors 2 and 3, the feedback capacitor 11 is again charged through the resistor 21 as well as the feedback resistor 27 to the sum of the voltage values of the accumulator voltage U and the base-emitter voltage of the transistor 1. For this process, the diode 33 decouples the voltage divider formed by the resistors 23 and 25 from the resistor 21. The diode 35 which is preferably a germanium diode serves to emulate the voltage characteristic of the accumulator as a function of temperature by means of the electronic circuitry. The desired value of the upper turn-off voltage is determined by the voltage divider 23/25.

Figure 3:
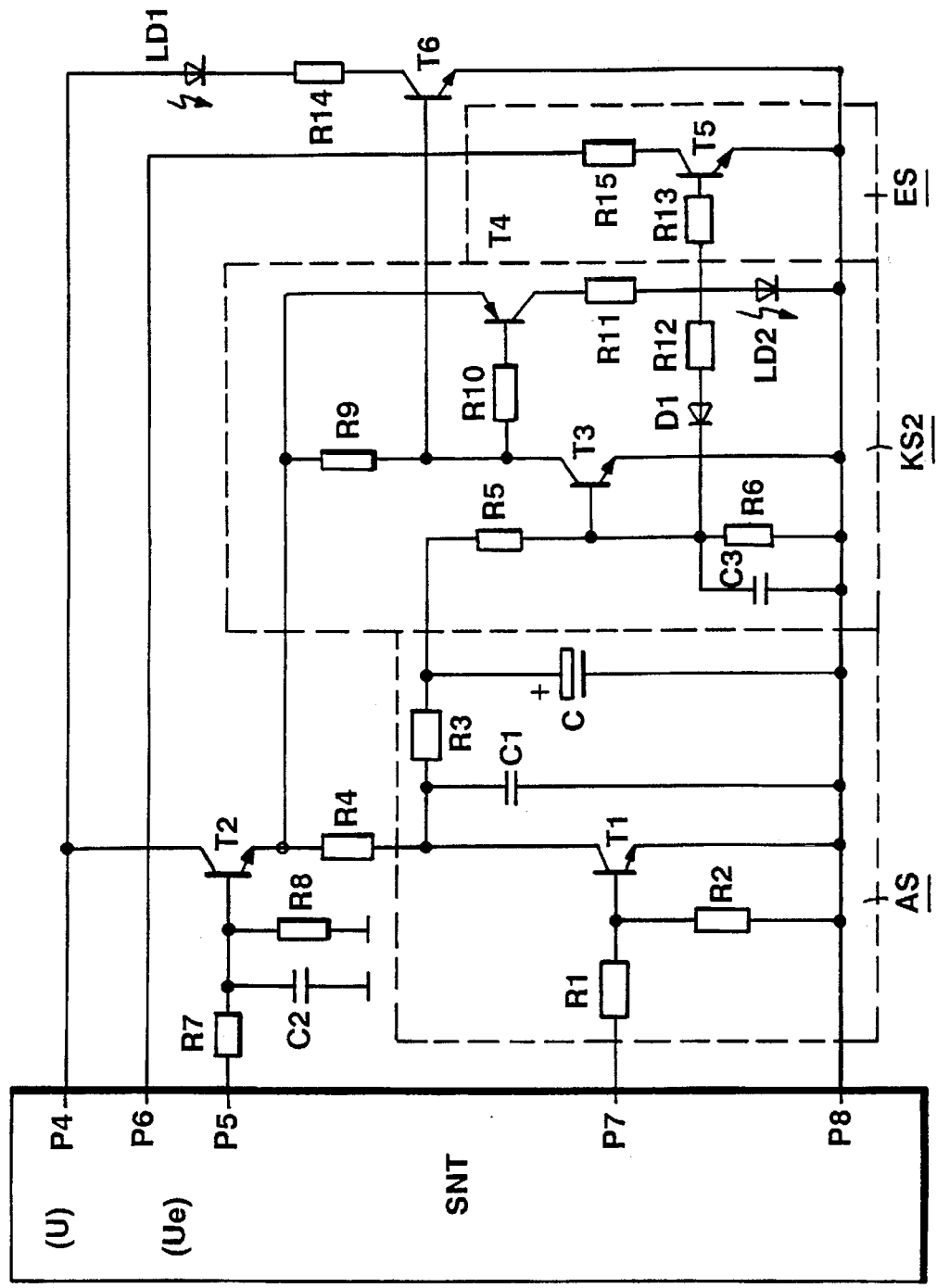
FIG. 3 is a diagram illustrating a detailed embodiment of a switching arrangement of the present invention, as used in a switched-mode power supply of FIG. 2.

FIG. 3 shows an embodiment of the arrangement of the present invention as used in a switched-mode power supply STN of FIG. 2. The box on the left which is identified by STN is understood to include the switched-mode power supply illustrated in FIG. 2, with the junction points being identified correspondingly.

The rectified input voltage Ue (junction point P5 in FIG. 2) is applied, through a resistor R7, to the base of a transistor T2 in FIG. 3 whose collector-emitter circuit couples an evaluating circuit AS and a trigger circuit KS2 to the positive terminal of the accumulator (junction point P4) in FIG. 2. In addition, the base of the transistor T2 is connected, through the parallel arrangement of a resistor R8 and a capacitor C2, to reference potential which corresponds to the junction point P8 in FIG. 2. The transistor T2 is rendered conducting through the voltage divider R7/R8 only when the power plug is plugged in, so that the evaluating circuit AS and the trigger circuit KS2 are only coupled to the accumulator when the power plug is plugged in, in order to prevent an unnecessary current drain from the accumulator 61 when the power plug is pulled. The capacitor C2 serves to filter any voltage peaks from the line.

The input of the evaluating circuit AS of FIG. 3 resides at the node P7 of FIG. 2 and is delivered, through a voltage divider R1/R2, to the base of a transistor T1 having its collector connected to the emitter of the transistor T2 through a resistor R4, while its emitter is connected to reference potential. Moreover, the collector of the transistor T1 is connected, through a resistor R3, to the one end of a capacitor C having its other end connected to reference potential, in addition to being directly coupled to reference potential through a capacitor C1. The capacitor C1 serves to filter the signal residing at the collector of the transistor T1. The positive pole of the capacitor C whose voltage potential is the measure of the ratio of the duration of oscillation pauses to the duration of oscillation bursts of the switched-mode power supply, is delivered to the input of a trigger circuit KS2.

The trigger circuit KS2 is essentially comprised of the transistors T3 and T4. The positive potential of the capacitor C is delivered, through a voltage divider R5/R6, to the base of the transistor T3, with the resistor R6 being connected in parallel with a capacitor C3 which are both tied to reference potential. The capacitor C3 serves a filtering function. The collector of the transistor T3 is connected to the emitter of the transistor T2 through a resistor R9, and to the base of the transistor T4 through a resistor R10. The emitter of the transistor T4 is directly coupled to the emitter of the transistor T2, while the collector of the transistor T4 is connected to reference potential through a resistor R11 and a light-emitting diode LD2.

As long as the converter is oscillating, that is, during the occurrence of pulse bursts, the potential at the junction point P7 in FIG. 2 is on an average (integrated over time) more positive than during the occurrence of pulse spaces. The base voltage divider R1/R2 of the transistor T1 in FIG. 3 is so dimensioned that the transistor T1 is conducting during the occurrence of pulse bursts, while being non-conducting during the occurrence of pulse spaces. During the occurrence of pulse spaces, the capacitor C is charged through the conducting transistor T2 and the resistors R4 and R3 (transistor T2 being always conducting as long as the power plug is plugged in), because the transistor T1 is off, and during the occurrence of pulse bursts the capacitor C is rapidly discharged through the resistor R3 and the conducting transistor T1. By comparison with the resistor R4, the resistor R3 is low-resistance (R4 being, for example, 20×R3, approximately).

With the accumulator charge progressively increasing, the operating pauses (oscillation pauses) of the converter will increase, and the voltage across the capacitor C will rise. When the voltage across the capacitor C has reached a specified level, that is, from the point when the ratio of the duration of oscillation pauses to the duration of oscillation bursts exceeds a specified magnitude, the transistor T3 of the trigger circuit KS2 will be rendered conducting through the base voltage divider R5/R6. This base voltage divider R5/R6 functions at the same time as a discharging resistor for the capacitor C as it is charged, being, however, about ten times greater than the actual discharging resistor R3. With the transistor T3 becoming conducting, the transistor T4 of the trigger circuit KS2 will also conduct, and the light-emitting diode LD2 will emit light. The transistor T3 will be held in the conductive state through the feedback resistor R12 and the decoupling diode D1. Because the voltage drop across the light-emitting diode LD2 is 2.3 volts, approximately, the transistor T3 will be thereby locked in its conductive state through its base, preventing it from switching back.

Figure 5:
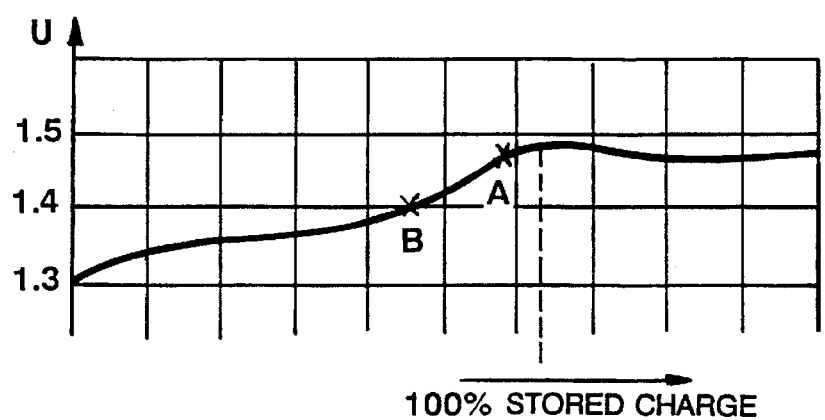
FIG. 5 is a graphical representation of the typical cell voltage during charging of an accumulator, plotted as a function of the stored charge.

The conducting transistor T4 of the trigger circuit KS2 also causes the transistor T5 of the adjusting device ES to be turned on, so that, through the junction point P6, the resistor R15 in FIG. 3 is connected in parallel to the resistor 23 in FIG. 2 tied to reference potential, whereby the originally upper switching voltage (A) is lowered to a lower switching voltage (B) (see FIG. 5).

By means of a switching arrangement according to FIG. 3, in a switched-mode power supply of FIG. 2 the upper switching voltage A can reside at a point just in advance of the hump of the charging characteristic in FIG. 5, for example, at 2.95 volts in a two-cell accumulator. The charging current then follows approximately the curve drawn in a solid line in FIG. 4. At the instant of time t1, the switching voltage is lowered to point B (FIG. 5), for example, to 2.8 volts, whereby the switched-mode power supply is deactivated. The curve drawn in broken lines in FIG. 4 shows the approximate course of the charging current of a switched-mode power supply of FIG. 2 in the absence of an arrangement according to FIG. 3.

Figure 4:
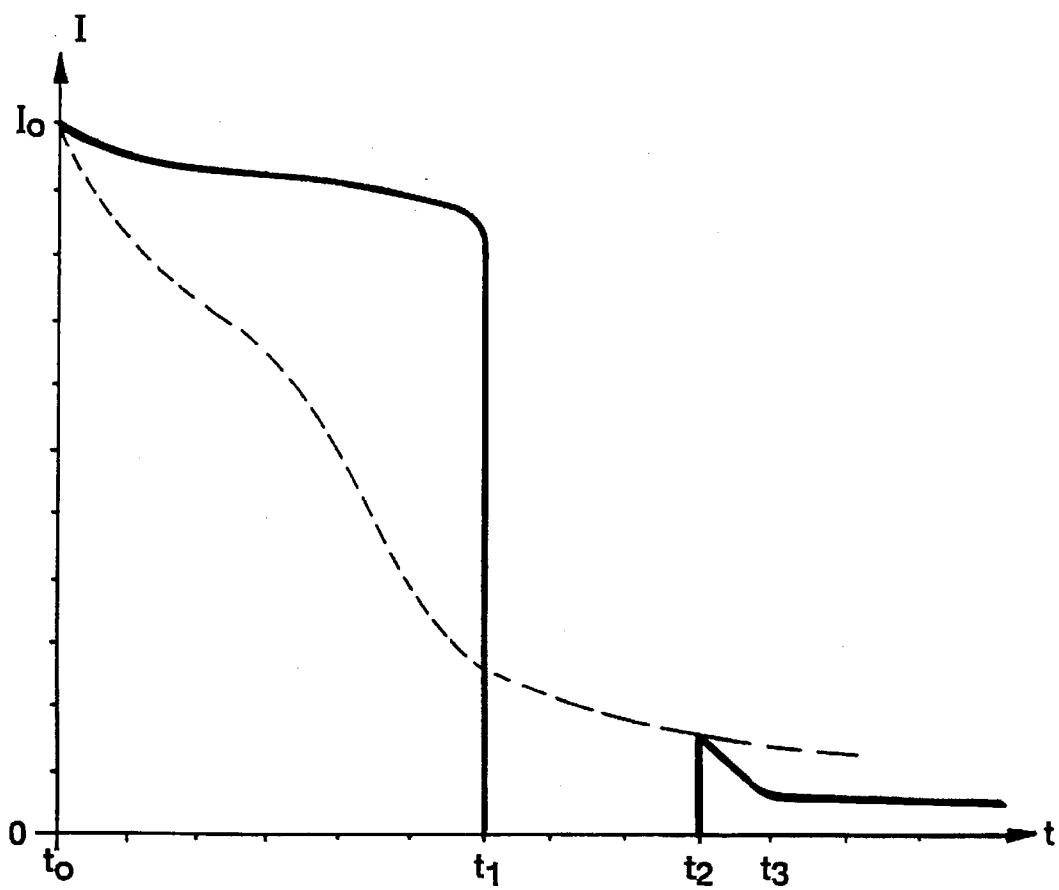
FIG. 4 is a graphical representation of the charging current during charging of an accumulator, plotted as a function of the charging time.

In the space following the instant of time t1 in FIG. 4, the accumulator cools down and the accumulator voltage U drops. After a period of, for example, 10 to 20 minutes, approximately (instant of time t2), the accumulator voltage reaches the level of the lower switching voltage B (2.8 volts), and the switched-mode power supply turns on again. The accumulator then receives the remainder of the charge until it is fully charged. The magnitude of the recharging current depends on the amount of the remaining charge, being yet invariably lower than before in consequence of the lowered switching voltage B. Oscillation pauses and oscillation bursts occur in alternating sequence as before. At the instant of time t3, the oscillation pauses are so long as compared with the oscillation bursts that only the trickle-charging current flows. The accumulator has reached its fully charged condition.

This condition is maintained, that is, the transistors T3 and T4 of the trigger circuit KS2 as well as the transistor T5 remain conducting, and hence the lower switching voltage B is kept active until the power plug is pulled or the electrical load 62 (direct-current motor) is connected to the circuit by means of the switch 63.

When the switched-mode power supply is disconnected from the line and connected to it again, the trigger circuit KS2 is reversed, the transistor T5 is switched off again, and hence the higher switching voltage A is rendered active again. By a repeated evaluation of the ratio of pulse spaces to pulse duration of the switched-mode power supply, the charging process is deactivated again, without a prior discharge, after a short period of time as described above. Plugging and unplugging can be repeated as often as desired without incurring the risk of overcharging the accumulator.

It is also an essential advantage that the evaluation of the ratio of pulse spaces to pulse duration enables a defined charge status of the accumulator to be annunciated. To this end, FIG. 3 provides between the junction point P4 in FIG. 2 (positive pole of the accumulator) and reference potential the series arrangement of a light-emitting diode LD1, a resistor R14 and the main current path of a transistor T6. The base of the transistor T6 is applied to the collector of the transistor T3 of the trigger circuit KS2, causing the transistor T6 to conduct and hence the light-emitting diode LD1 to emit light so long as the transistor T3 is non-conducting, that is, so long as the high-current charging period lasts. Because the transistor T4 remains off during this period, the light-emitting diode LD2 in the main current path of the transistor T4 is extinguished. When the high-current charging period has ended at the instant of time t1 and the trigger circuit KS2 reverses its state, the light-emitting diode LD1 will be extinguished, and the light-emitting diode LD2 will start emitting light.

I claim:

1. An electronic switched-mode power supply for supplying power to an accumulator from an input voltage source, the power supply comprising:
   (1) a self-oscillating flyback converter comprising
       (a) a switching transistor having a base and a collector-emitter circuit;
       (b) a first resistor;
       (c) a diode;
       (d) a feedback circuit;
       (e) a control circuit; and
       (f) a transformer with a primary winding and a secondary winding, wherein the primary winding, in a series arrangement with the collector-emitter circuit of the switching transistor and the first resistor, is connected in parallel with the input voltage source, and wherein the secondary winding is connected in series with the accumulator and the diode, with the base of the switching transistor being connected to the secondary winding through the feed back circuit in addition to being coupled to the control circuit, wherein the control circuit during operation inhibits conduction of the switching transistor when a voltage at the accumulator has increased to a switching voltage and renders the switching transistor conducting again when the voltage at the accumulator has dropped below this switching voltage; and
   (2) a switching arrangement which drives the control circuit such that the switching voltage is lowered to a lower switching voltage value when, with the switched-mode power supply in a pulsed mode, a ratio of a duration of oscillation pauses to a duration of oscillation bursts exceeds a specified magnitude, the switching arrangement comprising an evaluating circuit, connected to the flyback converter, for detecting the ratio of the duration of oscillation pauses to the duration of oscillation bursts, a trigger circuit connected to the evaluating circuit and the control circuit, the evaluating circuit causing the trigger circuit to pass to a different condition when the ratio of the duration of oscillation pauses to the duration of oscillation bursts exceeds the specified magnitude, wherein, when passed to a to a different condition, trigger circuit drives the control circuit such that the switching voltage of the control circuit is lowered to the lower switching voltage value, thereby terminating a high-current charging period.

2. The electronic switched-mode power supply as claimed in claim 1, further comprising a second resistor, and wherein the evaluating circuit comprises a first transistor having a base and a collector-emitter circuit, the base of the first transistor is connected for rendering the collector-emitter circuit of the first transistor conducting during the occurrence of the oscillation bursts;

a third resistor; and a capacitor, connected to the accumulator, the third second and third resistors, and the collector-emitter circuit of the first transistor, wherein the capacitor is charged by the accumulator during the oscillation pauses through the second resistor and is discharged during the occurrence of the oscillation bursts through the third resistor and the collector-emitter circuit of the first transistor when the collector-emitter circuit of the first transistor is conducting.

3. The electronic switched-mode power supply as claimed in claim 1, and a load, wherein the trigger circuit comprises a first transistor having a base and a collector-emitter circuit; and a second transistor, having a base and a collector-emitter circuit;

wherein the bases of the first and second transistors are connected for rendering the collector-emitter circuits of the first and second transistors conducting when the ratio of oscillation pauses to oscillation bursts has reached the specified magnitude, and the collector-emitter circuits of the first and second transistors remain conducting until the switched-mode power supply is disconnected from the input voltage source or until the load is connected in parallel with the accumulator.

4. The electronic switched-mode power supply as claimed in claim 1, further comprising a voltage divider for determining the switching voltage, the voltage divider comprising a second resistor; and wherein the switching arrangement further comprises an adjusting device that comprises a third resistor;

a first transistor;

wherein the first transistor is connected such that when the first transistor is conducting, the third resistor is connected in parallel with the second resistor for determining the lower switching voltage value.

5. The electronic switched-mode power supply as claimed in claim 1, further comprising a display device, connected for displaying prior to when the switching voltage is lowered to the lower switching voltage value.

6. The electronic switched-mode power supply as claimed in claim 1, comprising a display device, connected for displaying when the switching voltage is at the lower switching voltage value.

7. The electronic switched-mode power supply as claimed in claim 5, further comprising a first transistor comprising a collector-emitter circuit, wherein the display device comprises a light-emitting diode and wherein the collector-emitter circuit of the first transistor and the light-emitting diode are connected in a series arrangement and, the series arrangement is connected in parallel with the accumulator.

8. The electronic switched-mode power supply as claimed in claim 3, further comprising a display device, comprising a light-emitting diode connected in series with the collector-emitter circuit of the second transistor.

9. The electronic switched-mode power supply as claimed in claim 1, further comprising a first transistor, wherein the evaluating circuit and the trigger circuit are connected to the accumulator through the first transistor when the input voltage source is connected.

10. The electronic switched-mode power supply as claimed in claim 6, further comprising a first transistor comprising a collector-emitter circuit, wherein the display device comprises a light-emitting diode connected in a series arrangement with the collector-emitter circuit of the first transistor.

* * * * *